United States Patent
Iida et al.

(10) Patent No.: US 11,093,711 B2
(45) Date of Patent: Aug. 17, 2021

(54) ENTITY-SPECIFIC CONVERSATIONAL ARTIFICIAL INTELLIGENCE

(71) Applicant: Microsoft Technology Licensing, LLC, Redmond, WA (US)

(72) Inventors: Katsuya Iida, Tokyo (JP); Momo Klyen, Tokyo (JP); Keizo Fujiwara, Kanagawa (JP); Xianchao Wu, Tokyo (JP); Zhan Chen, Tokyo (JP)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 15/433,162

(22) Filed: Feb. 15, 2017

(65) Prior Publication Data
US 2018/0089164 A1 Mar. 29, 2018

Related U.S. Application Data

(60) Provisional application No. 62/400,951, filed on Sep. 28, 2016.

(51) Int. Cl.
*G06F 40/253* (2020.01)
*G06N 5/02* (2006.01)
(Continued)

(52) U.S. Cl.
CPC ...... *G06F 40/253* (2020.01); *G06F 16/24578* (2019.01); *G06F 16/90332* (2019.01);
(Continued)

(58) Field of Classification Search
CPC ...... G06N 99/005; G06N 7/005; G06N 3/088; G06N 3/0454; G06N 4/022;
(Continued)

(56) References Cited

U.S. PATENT DOCUMENTS 6,655,963 B1 * 12/2003 Horvitz .................. G06Q 30/02
434/236
8,479,094 B2 * 7/2013 Fouts .................. G06F 17/2705
707/770
(Continued)

FOREIGN PATENT DOCUMENTS

WO 2006129968 12/2006
WO 2007134402 11/2007

OTHER PUBLICATIONS

Fulay, Amit, "Say hello to Google Allo: a smarter messaging app", https://googleblog.blogspot.in/2016/09/google-allo-smarter-messaging-app.html, Sep. 20, 2016, 8 pages.
(Continued)

*Primary Examiner* — Olujimi A Adesanya
(74) *Attorney, Agent, or Firm* — Merchant & Gould P.C.

(57) ABSTRACT

The present disclosure is directed to systems, methods and devices for providing artificial intelligence (AI) entity-specific feedback. Official content related to an entity or entity figure may be extracted and analyzed. The extracted content may be classified in an entity corpus based on a determined language style of the content. An input into a conversational AI system may be received. A plurality of potential responses related to the input may be determined from one or more entity corpus. Each of the plurality of potential responses may be ranked according to a rank match value calculated for each of the plurality of determined responses, and at least one of potential responses may be provided as feedback.

20 Claims, 7 Drawing Sheets

(51) Int. Cl.
  *G06N 20/00* (2019.01)
  *G06K 9/62* (2006.01)
  *G06F 16/9032* (2019.01)
  *G06F 16/2457* (2019.01)
  *G06K 9/00* (2006.01)

(52) U.S. Cl.
  CPC ....... *G06K 9/00677* (2013.01); *G06K 9/6223* (2013.01); *G06N 5/022* (2013.01); *G06N 20/00* (2019.01); *G06K 9/6217* (2013.01)

(58) Field of Classification Search
  CPC . G06F 17/2785; G06F 17/2881; G10L 15/08; G10L 15/197
  USPC ....................................................... 704/9, 10
  See application file for complete search history.

(56) References Cited

U.S. PATENT DOCUMENTS

| | | | |
|---|---|---|---|
| 8,812,534 B2* | 8/2014 | Platt | G06F 16/242 |
| | | | 707/768 |
| 8,953,764 B2 | 2/2015 | Bouzid et al. | |
| 8,977,584 B2 | 3/2015 | Jerram et al. | |
| 9,280,610 B2 | 3/2016 | Gruber et al. | |
| 9,306,878 B2 | 4/2016 | Patil | |
| 9,984,062 B1* | 5/2018 | Strope | G06F 17/2775 |
| 2005/0105712 A1* | 5/2005 | Williams | G10L 13/027 |
| | | | 379/265.02 |
| 2007/0106663 A1* | 5/2007 | Rosenberg | G06F 16/34 |
| 2011/0055186 A1* | 3/2011 | Gopalakrishnan | |
| | | | G06F 16/9535 |
| | | | 707/706 |
| 2011/0252011 A1* | 10/2011 | Morris | H04L 12/185 |
| | | | 707/706 |
| 2011/0288897 A1* | 11/2011 | Erhart | G06Q 10/06 |
| | | | 705/7.13 |
| 2012/0233161 A1* | 9/2012 | Xu | G06F 16/313 |
| | | | 707/732 |
| 2013/0060763 A1* | 3/2013 | Chica | G06F 16/335 |
| | | | 707/723 |
| 2013/0198762 A1* | 8/2013 | Thorpe | G06F 9/453 |
| | | | 719/318 |
| 2014/0163954 A1* | 6/2014 | Joshi | G06F 17/276 |
| | | | 704/9 |
| 2014/0164476 A1 | 6/2014 | Thomson | |
| 2014/0172989 A1* | 6/2014 | Rubinstein | H04L 51/32 |
| | | | 709/206 |
| 2014/0279050 A1 | 9/2014 | Makar et al. | |
| 2015/0012464 A1 | 1/2015 | Gilbert | |
| 2015/0163358 A1* | 6/2015 | Klemm | G06Q 30/01 |
| | | | 379/88.01 |
| 2015/0227973 A1* | 8/2015 | Wirtz | G06F 16/951 |
| | | | 705/14.57 |
| 2015/0248478 A1* | 9/2015 | Skupin | G06F 16/367 |
| | | | 707/609 |
| 2015/0269125 A1* | 9/2015 | Desai | G06F 17/212 |
| | | | 715/752 |
| 2015/0286747 A1 | 10/2015 | Anastasakos et al. | |
| 2016/0063993 A1* | 3/2016 | Dolan | G10L 15/08 |
| | | | 704/254 |
| 2016/0132590 A1* | 5/2016 | Byron | G06F 16/3329 |
| | | | 707/734 |
| 2016/0162576 A1* | 6/2016 | Arino de la Rubia | |
| | | | G06F 17/2765 |
| | | | 707/739 |
| 2016/0196313 A1* | 7/2016 | Allen | G06F 16/3329 |
| | | | 707/723 |
| 2017/0039271 A1* | 2/2017 | Bishop | G06F 40/211 |
| 2017/0046748 A1* | 2/2017 | Zhou | G06Q 30/0276 |
| 2017/0180276 A1* | 6/2017 | Gershony | H04L 51/02 |
| 2018/0032620 A1* | 2/2018 | Kasravi | G06F 16/335 |
| 2018/0039629 A1* | 2/2018 | Arsikere | G06F 16/24578 |
| 2018/0359199 A1* | 12/2018 | Nguyen | G06Q 10/107 |

OTHER PUBLICATIONS

Betters, Elyse, "What is Google Assistant, how does it work, and when can you use it?", http://www.pocket-lint.com/news/137722-what-is-google-assistant-how-does-it-work-and-when-can-you-use-it, Sep. 21, 2016, 7 pages.

Wright, David, "Are chatbots and AI the new apps?", http://us.kantar.com/tech/social/2016/facebook8-and-the-race-to-launch-bot-shops/, Apr. 13, 2016, 6 pages.

Catanzariti, Patrick, "How to Build Your Own AI Assistant Using Api.ai", https://www.sitepoint.com/how-to-build-our-own-ai-assistant-using-api-ai/, Jan. 11, 2016, 27 pages.

* cited by examiner

ENTITY-SPECIFIC CONVERSATIONAL ARTIFICIAL INTELLIGENCE

BACKGROUND

Businesses, universities and other entities are increasingly delivering content to their customers and the general public using social media outlets and direct messaging applications. In so doing those entities generally must employ social media specialists in order to deliver personalized content and accurately reflect the voice and language style of the entity. Additionally, although relatively specific problems are discussed, it should be understood that the aspects should not be limited to solving only the specific problems identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods and devices for providing artificial intelligence entity-specific feedback to users in a style type corresponding to a personality, or voice, of an entity. An entity corpus comprised of language that has been extracted from sources associated with the entity and further classified into one or more language style types may be created for a plurality of entities. User input may be classified into one or more language style types. Style type match values may be determined between classified entity language style type and user language style type. Those match values may be used in determining an appropriate entity to provide feedback to a user, as well as in determining specific responses from an entity to provide to a user. Inappropriate content filters may be applied to ensure that users are not provided with inappropriate content as feedback.

DETAILED DESCRIPTION

Figure 1:
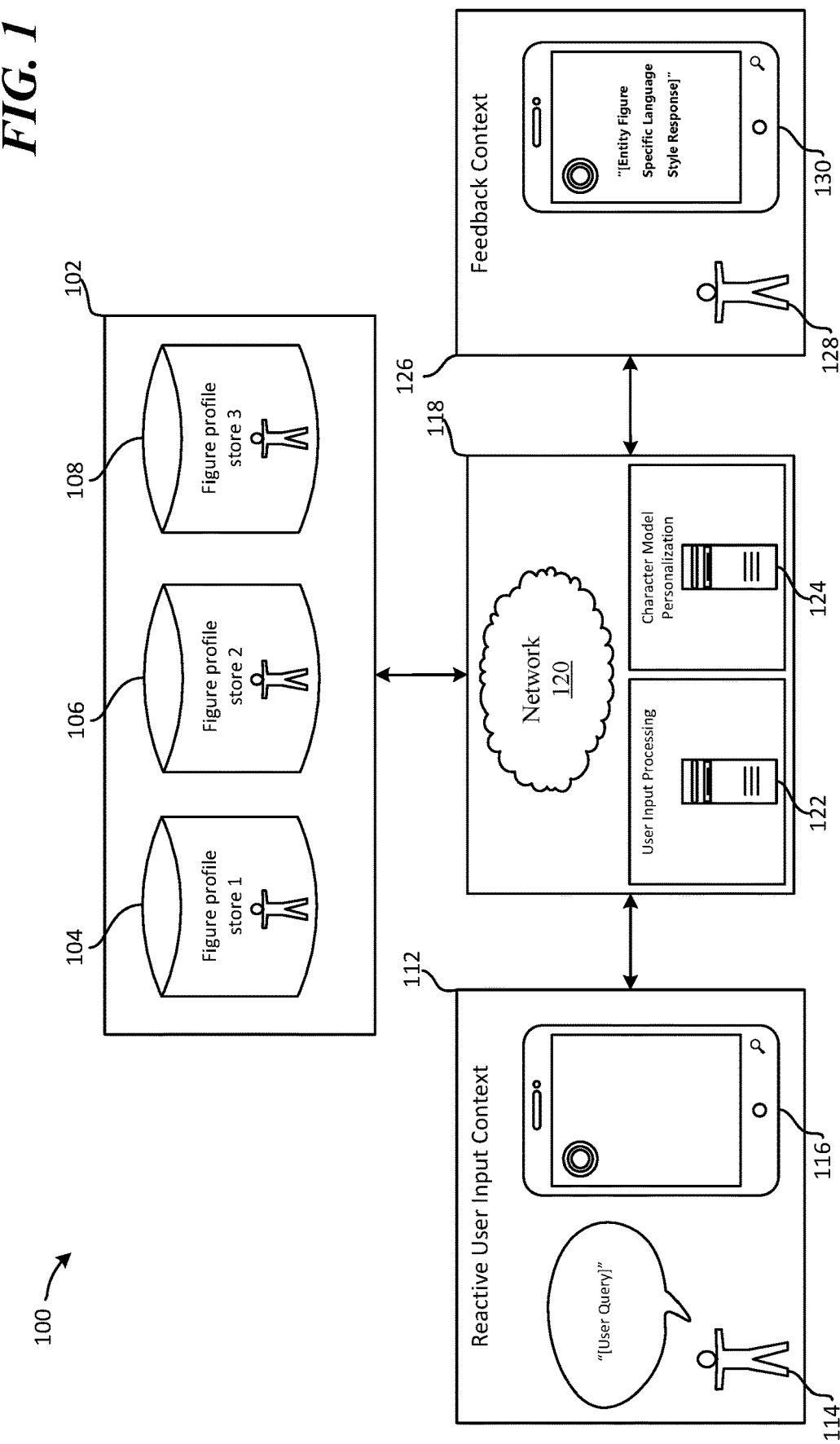
FIG. 1 illustrates an exemplary schematic diagram of an environment for providing artificial intelligence entity-specific feedback to a user.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems and methods for delivering personalized AI entity-specific feedback to users via social media platforms, direct messaging applications, SMS messaging applications, AI accounts associated with robots, cars, and other devices connected to AI entity accounts through the Internet of Things, digital assistants, and entity website bots, among others. An entity such as a business, an organization, a university, fictional character, media personality, individual, or other entity, may provide personalized feedback to a client in a machine-learned language style (e.g., informal language style, formal language style, age-specific language style, demographic-specific language style, etc.) that accurately reflects the personality, or "voice," of the entity. That is, the systems and methods described herein provide mechanisms for providing feedback in a machine-learned stylistic manner corresponding to an entity or "entity figure" (e.g., a commercial personality of a company) specific language style.

According to some aspects, personalized feedback may be provided to a client in a machine-learned language style that matches a determined language style of one or more users of a client computing device that is in communication with an AI entity. According to examples, the AI entity responses may be entirely computer-generated, without necessitating a person associated with the entity to craft predetermined potential user queries that are expected to be provided to the entity and/or custom responses as they relate to those potential user queries.

According to examples an entity or "entity figure" specific language style may be provided by an AI bot or other automated response mechanism. For example, an entity may communicate with users via an AI bot or other automated response mechanism created to reflect the personality of an entity or a figure associated with an entity, as well as a specific language style for that entity figure, such that a user may believe they are interacting with the actual entity figure (or a person acting on behalf of the entity such as a social media account specialist) rather than an automated response mechanism such as an AI bot.

Thus, aspects of the invention are advantageous in that the invention eliminates or minimizes the need to train and hire entity communication specialists (e.g., social media specialists) to communicate with the public a desired entity public voice or personality. Similarly, in examples, the invention allows for systematic discovery of new content related to an entity, such that if the voice or personality of the entity should change over time as the entity's public content (e.g., entity website content, social media content, etc.) changes over time, the automated response mechanisms described herein may dynamically incorporate those changes. This is advantageous in eliminating or minimizing the need to re-train communication specialists on such content and/or develop new automated responses to queries that accurately reflect a current voice or personality of the entity.

According to some aspects an entity corpus may be created using language data extracted from applications and websites associated with a specific entity figure or entity. For example, tweets, blog entries or website content associated with an entity may be analyzed to build entity-specific language models (e.g., processing extracted language using n-gram language models, skip-gram language models, bag-of-words language models, Word2Vec language models, neural network language models, etc.) such that an automated response mechanism (e.g., an AI bot) for the entity may provide feedback and responses in a style and manner consistent with a determined personality for the entity.

One or more language models may be applied to an extracted language set according to a determined language style type associated with an entity. For example a tri-gram language model may be applied for one language type (e.g., formal language, informal language, age-specific, demographic-specific, etc.) and a unigram language model may be applied for a second language type. Additionally, different language model types may be applied based on an identified dialect or language type associated with a specific entity. For example, if the language being analyzed is Japanese, a tri-gram language model may be appropriate for hiragana strings and a unigram language model may be appropriate for katakana strings.

Processing of an extracted language set of for an entity (e.g., language from an entity's twitter posts, blog entries, website content, etc.) may be performed to cluster extracted language from those sources into language style type clusters (e.g., formal language, informal language, age-specific language, demographic-specific language, etc.). For example, natural language processing and machine learning may be utilized to classify (e.g., through K-means clustering, semi-supervised K-means clustering, Gaussian mixture models, k-medoids clustering, etc.) extracted language from entity-specific language sources into language style type clusters. According to some examples, based on the clustering of language extracted from entity-specific sources, a single language style for the entity may be determined. According to other examples, based on the clustering of language extracted from entity-specific language sources, a plurality of language styles for an entity may be determined.

The clustering of extracted language for an entity into language style type categories may utilized to determine a style type in which to provide user feedback. For example, an AI entity may provide responses in a singular language style type, or an AI entity may provide responses in a plurality of language styles based on the particular circumstances of a user interaction (e.g., a more formal language style may be chosen when interacting via conversational AI with an adult than with a child).

According to some examples, processing of user input into a conversational AI system may be performed to cluster user language into language style type clusters (e.g., formal language, informal language, age-specific language, demographic-specific language, etc.). For example, natural language processing and machine learning may be utilized to classify extracted language from user input into a conversational AI system and/or applications and other user-associated content, into language style type clusters.

According to some aspects, a language style type match analysis of clustered entity language to clustered user language may be performed and match values may be assigned. Those match values may be used in ranking potential language styles that may be provided as feedback to users by conversational AI entities. Additionally or alternatively, individual potential responses for conversational AI entities may be provided in response to received user input and assigned individual match values for ranking of those potential responses.

The systems and methods described herein may provide feedback to a user based on an AI entity corpus that has been determined from analysis of content related to that entity (e.g., extracted language associated with an entity) and classification of that information, such that the feedback resembles a language style of a user that has provided input to a conversational AI system as described herein. For example, if a determination has been made that a user's conversational AI input query comprises informal language, a response from a corresponding AI entity that has a corpus comprised of informal language or primarily informal language, and corresponding informal response types, may be provided to the user. Additionally, match values may be assigned to one or more AI entity based on a determined language style for that AI entity or entity figure, in relation to a determined language style type for a user, and one or more responses from a top ranked or multiple high ranked AI entities may be provided to a user based on the match value assignment (e.g., the greater the match value, the closer the match between AI entity language style type and user language style type). Additionally or alternatively, an administrator of an entity or entity figure account may provide custom rules such that a response that would not otherwise be provided to a user based on its match value assignment is provided to user, superseding the match value ranking.

AI entity or entity figure responses may be generated to reflect a specific language style for an AI entity or entity figure. For example, a language model may be created for an AI entity or entity figure based on extracted content from the Internet associated with the AI entity or entity figure, and a linear model may be utilized to predict whether one or more machine-generated responses correspond to a determined language style (e.g., a language style type classification) associated with the AI entity or entity figure. By processing the extracted content (e.g., language extracted from applications, social media accounts, and websites associated with an entity figure or entity) using one or more language models, frequently used sentence style of an entity may be ranked for incorporation in a response to specific users based on language style type match values as discussed above. In this manner, the systems and methods described herein are capable of dynamically generating user feedback in a language style type that accurately reflects the personality or voice of an entity.

A user interface may be provided which allows an official account owner or administrator of an entity account to modify suggested responses to meet a desired language style for their entity (e.g., the personality they wish their entity to exhibit during conversational AI). For example, when replying to a user query or input, if the user query or input matches a top ranked potential AI entity response, the modified response may supersede the top ranked response.

According to examples, a user interface may be provided which allows an official account owner or administrator of an AI entity account to add possible queries that may be received from users as well as customized potential responses to those queries. Thus, when a query matches a defined custom query, the custom answer may be provided to a user regardless of the top ranked query suggestion as determined by default language processing and machine mapping.

According to additional examples one or more profanity and offensive language filters may be implemented such that inappropriate content is not provided to a user as feedback by AI entity automated response mechanisms. For example, language processing may be utilized to determine whether one or more words or phrases match a flagged language corpus that includes known words and phrases that have been identified as being profane and/or potentially offensive. Additionally, based on machine learning and one or more language processing models, words and phrases that have been input into the AI entity system within a temporal threshold to when a word or phrase that has been identified as matching one or more words or phrases in a flagged language corpus, determinations may be made that the words or phrases that were received during the temporal threshold likely have a higher likelihood of containing profane or offensive language. For example, words and phrases that have been identified as being received during such a temporal threshold may be provided to a statistical analysis language module and determinations may be made to flag the identified words or phrases as profane or offensive and/or to add those words or phrases to an existing flagged language corpus. Machine learning and statistical pattern analytics may also be implemented in processing received user input that falls within a temporal threshold of identified profane or offensive language from a plurality of AI entity users or user accounts in making such determinations.

According to additional aspects, profanity and offensive language filters may be implemented which include a response filter for crawling the web to identify offensive keywords and phrases. After identification of offensive keywords and phrases from web crawling those identified keywords and phrases can be added to a global and/or entity-specific flagged language corpus which may be used to determine whether potential responses should be filtered because of their similarity to the identified offensive keywords and phrases. The filters described herein may include one or more query filters implementing one or more language models to detect if a query includes inappropriate language.

If a determination is made that a query likely includes inappropriate language, a pre-prepared response may be provided as feedback to avoid any possible inappropriate response. For example, a pre-prepared response may indicate that a subsequent query must be rephrased and/or that one or more words or phrases flagged in a received query cannot be processed because they have been flagged as possibly being inappropriate or offensive.

In addition to using web crawlers to identify offensive keywords and phrases, additional processing of those keywords and phrases may be performed such that slang terms, or other vernacular, which do not exactly match an identified offensive keyword or phrase, but have the same or similar meaning, are also identified and added to a flagged language corpus which may be used to filter inappropriate content. In addition, if a query is received, and language included in the query has been identified as potentially being inappropriate, queries from the same user or user account received within a temporal threshold of a received inappropriate query may be analyzed more rigorously than would otherwise be the case. For example, language in a subsequent query from the same user or user account that would not otherwise be flagged as possibly being inappropriate may be flagged as inappropriate for that user or user account if it meets a lesser threshold than if the user or user account had not previously been associated with a query that contained inappropriate language. Applying these techniques, additional inappropriate content labeling data can be identified and added to one or more flagged language corpus.

FIG. 1 illustrates an exemplary schematic diagram of an environment 100 for providing AI entity-specific feedback. Environment 100 comprises AI entity context 102 comprising entity figure profile store 1 104, entity figure profile store 2 106, and entity figure profile store 3 108. Each of the entity figure profile stores 104, 106 and 108 may comprise clustered language content associated with an entity and/or an entity figure, in addition to clustered responses based on a determined language style type for those respective entities and/or entity figures.

Environment 100 also includes reactive user input context 112, with user 114 (who may be the same user as user 128) and computing device 116 (which may be the same device as computing device 130), network processing context 118 including network 120, user input processing performed by one or more computing devices such as server computing device 122, and entity figure model personalization performed by one or more computing devices such as server computing device 124, as well as feedback context 126 including user 128 and computing device 130.

According to examples, a user 114 may input a query to computing device 116 and the query may be provided, via network 120, to one or more computing devices such as server computing device 122 for processing of the input. User input processing may include language processing (e.g., natural language processing) of the input and machine learning in order to determine a language style type for the user's input (e.g., informal language style, formal language style, etc.). Processing of the input may also include, based on natural language processing and application of one or more language models, clustering of that input into language style type classification categories.

Upon processing the user input, determinations may be made as to which AI entities may provide a relevant response in relation to the received query, and as to which of those AI entities have a determined language style that most closely matches a determined language style of a user, such as user 114. For example, one of entity figure profile stores 104, 106 and 108 may be associated with an entity figure for a specific entity, and entity figure model personalization processing performed via one or more computing devices, such as server computing device 124, may extract and analyze content related to the entity figure (e.g., via official websites, social media feeds, blog entries, etc.) and categorize that content into language style type and context type classifications.

One or more computing device in network processing context 118 may assign values to the classified content in relation to how closely those language style classifications match a query and a determined language style type for a user or user account associated with a query. Based on that ranking, determinations may be made as to what entity figure and/or what specific content within an entity figure store most closely matches the query and language style type. Based on those determinations, in feedback context 126, a response to the query may be provided, (e.g., a response may be provided to user 128 in relation the user's query in reactive user input context 112) that has been determined to have the highest ranked relevant content for that query and user.

Figure 2:
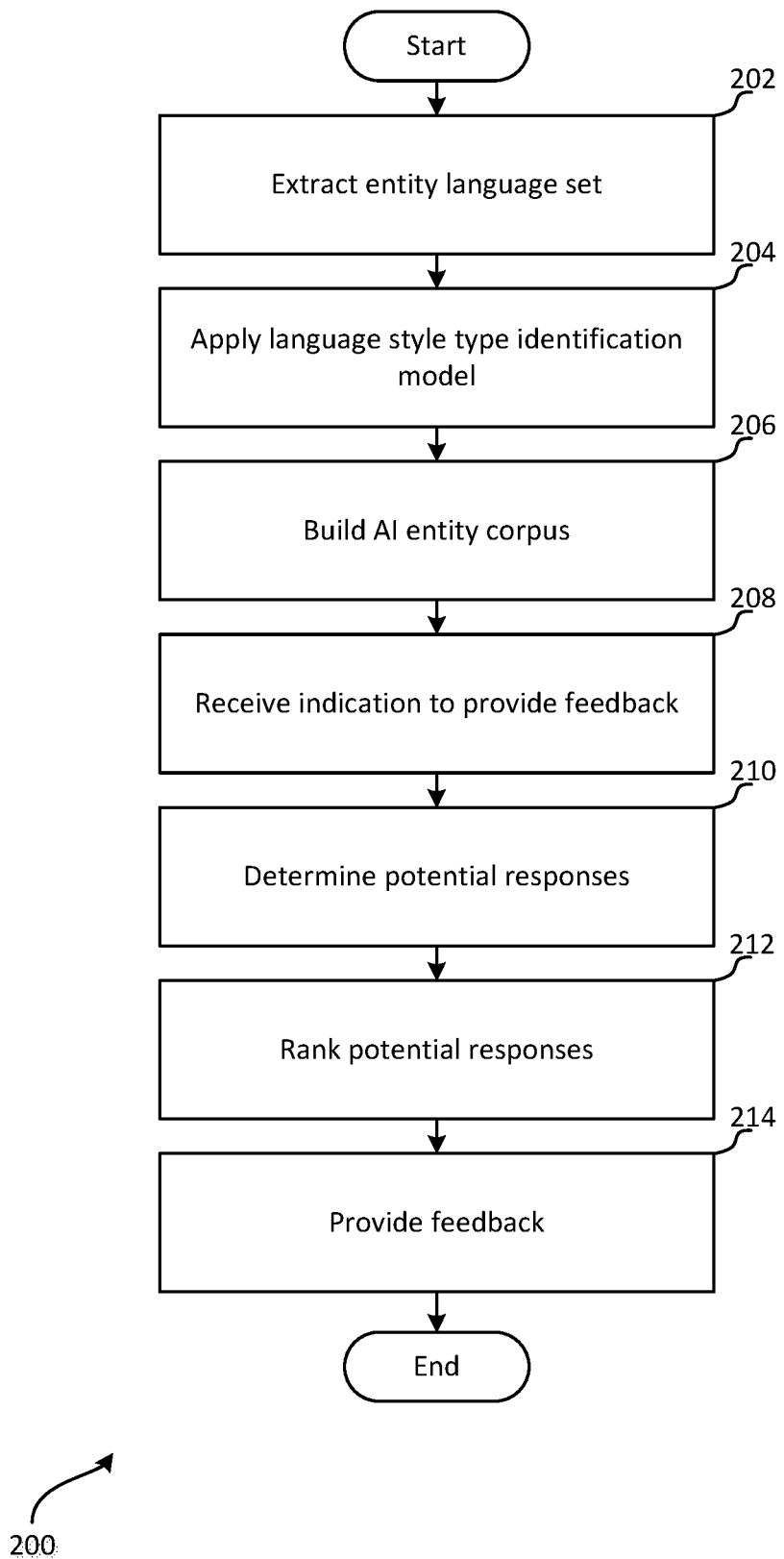
FIG. 2 illustrates an example method for providing artificial intelligence entity-specific feedback to a user.

FIG. 2 illustrates an example method 200 for providing artificial intelligence AI entity-specific feedback. The method 200 begins at a start operation and continues to operation 202 where an entity language set is extracted from one or more resources associated with an entity. Examples of resources from which language may be extracted comprise applications and or data stores associated with an entity, social media accounts, and websites associated with an entity (e.g., an official business website associated with an entity). For example, tweets, blog entries or website content associated with an entity may be analyzed to build entity-specific language models (e.g., n-gram language models, skip-gram language models, bag-of-words language models, Word2Vec language models, neural network language models, etc.).

From operation 202 flow continues to operation 204 where one or more language style type identification models are applied to the extracted entity language set such that one or more language style types associated with the extracted language set may be determined. For example, one or more language style type identification models may be utilized in processing extracted language sets to cluster language into language style type clusters (e.g., formal language, informal language, age-specific language, demographic-specific language, etc.). According to some examples, natural language processing and machine learning may be utilized to classify extracted language from entity-specific language sources into language style type clusters. Based on the clustering of language extracted from entity-specific language sources, a single language style for the entity may be determined, or multiple language styles for the entity may be determined. That is, an AI entity may provide responses, according to one or more clustered language style types, in a singular language style to users that interact with it, or the AI entity may provide responses in a plurality of language styles based on the particular circumstances of an interaction (e.g., a more formal language style may be chosen when interacting via conversational AI with an adult than with a child).

From operation 204 flow continues to operation 206 where an AI entity corpus may be constructed based on language that that has been extracted and clustered into language style type clusters. For example, the systems and methods described herein may provide feedback to a user based on an AI entity corpus that has been generated from analysis of content related to that entity and classification of that information, such that when feedback is provided to a user, it resembles a language style of a user that has provided input to a conversational AI system as described herein.

From operation 206 flow continues to operation 208 where an indication to provide feedback to a user is received. An indication to provide feedback to a user may be received in the way of a reactive language query, such as a user providing a digital assistant (e.g., Cortana, Siri, Alexa, etc.), or other AI entity associated with the systems and methods described herein, with a query or request. For example, a user may provide a digital assistant with a spoken request such as "show me directions to get home" or a query such as "what sports programs are on right now?" According to additional examples, the digital assistant or other AI entity may receive textual and/or gesture input indicating that feedback should be provided to a user.

In addition to receiving an indication to provide feedback in a reactive manner, an indication to provide feedback may be received in a proactive manner, such as receiving longitude and latitude coordinates from a user's mobile computing device and/or temporal information associated with a received input that indicates that feedback is likely to be useful for completing a task, etc.

From operation 208 flow continues to operation 210 where one or more potential responses to provide as feedback to a user are determined. For example, if a determination has been made that a user's conversational AI query comprises informal language, a response from a corresponding AI entity that has a corpus comprised of informal language or primarily informal language, and corresponding informal response types, may be provided to the user.

From operation 210 flow continues to operation 212 where potential responses which may be provided to a user are ranked. According to some aspects, a language style match analysis of clustered entity language to clustered user language may be performed and match values may be assigned which may be used in ranking potential language styles that may be provided in responding to received user input via conversational AI. Additionally or alternatively, individual potential responses for a conversational AI entity account may be provided in response to received user input and assigned individual match values for ranking those potential responses.

According to some examples, if a determination has been made that a user's conversational AI input comprises informal language, a response from a corresponding AI entity that has a corpus comprised of informal language, or primarily informal language, and corresponding informal response types, may be provided to the user. Additionally, values may be assigned to one or more AI entity based on a determined language style for that AI entity or entity figure, and one or more responses from a top ranked or multiple high ranked AI entities may be provided to a user based on the value assignment (e.g., a high value corresponds with a close language style match to a user). Additionally or alternatively, an administrator of an entity or entity figure account may provide custom rules such that a response that would not otherwise be provide to a user based on a language style type match value assignment/ranking is provided to a user, superseding the value ranking.

From operation 212 flow continues to operation 214 where feedback is provided to a user. According to some examples, feedback may be provided reactively in response to, for example, a query or a request for information. According to additional examples, feedback may be proactive and related to, for example, receiving user input that is related to past user input, which may be augmented with world knowledge (e.g., additional content related to past user input, as determined from sources such as the world wide web).

In providing feedback to a user, various filters may be applied such that inappropriate responses, suggestions and answers, which may otherwise be relevant to a user based only on processing of the user input, are not provided to a user. Filters that may be applied include age-appropriate content filters (e.g., certain language may be deemed too complex or too adult-oriented for one or more age groups), preference filters (e.g., a user's past input may indicate that the user does not like R-rated horror movies even if they have been determined to be over the age of 17 years of age), sexual content filters, and profanity filters, among others.

From operation 214 flow continues to an end operation and the method 200 ends.

Figure 3:
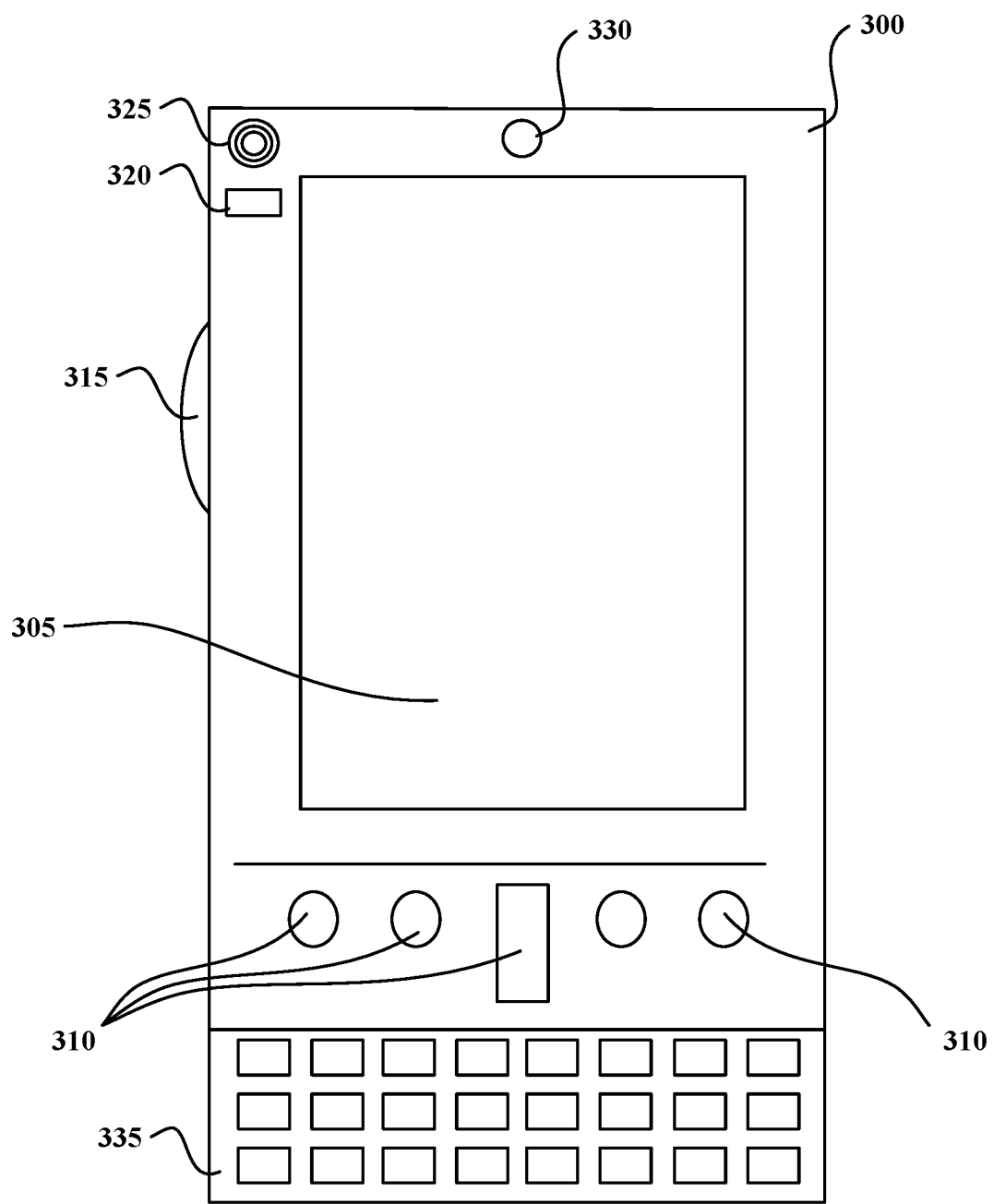
FIGS. 3 and 4 are simplified block diagrams of a mobile computing device with which aspects of the disclosure may be practiced.
Figure 4:
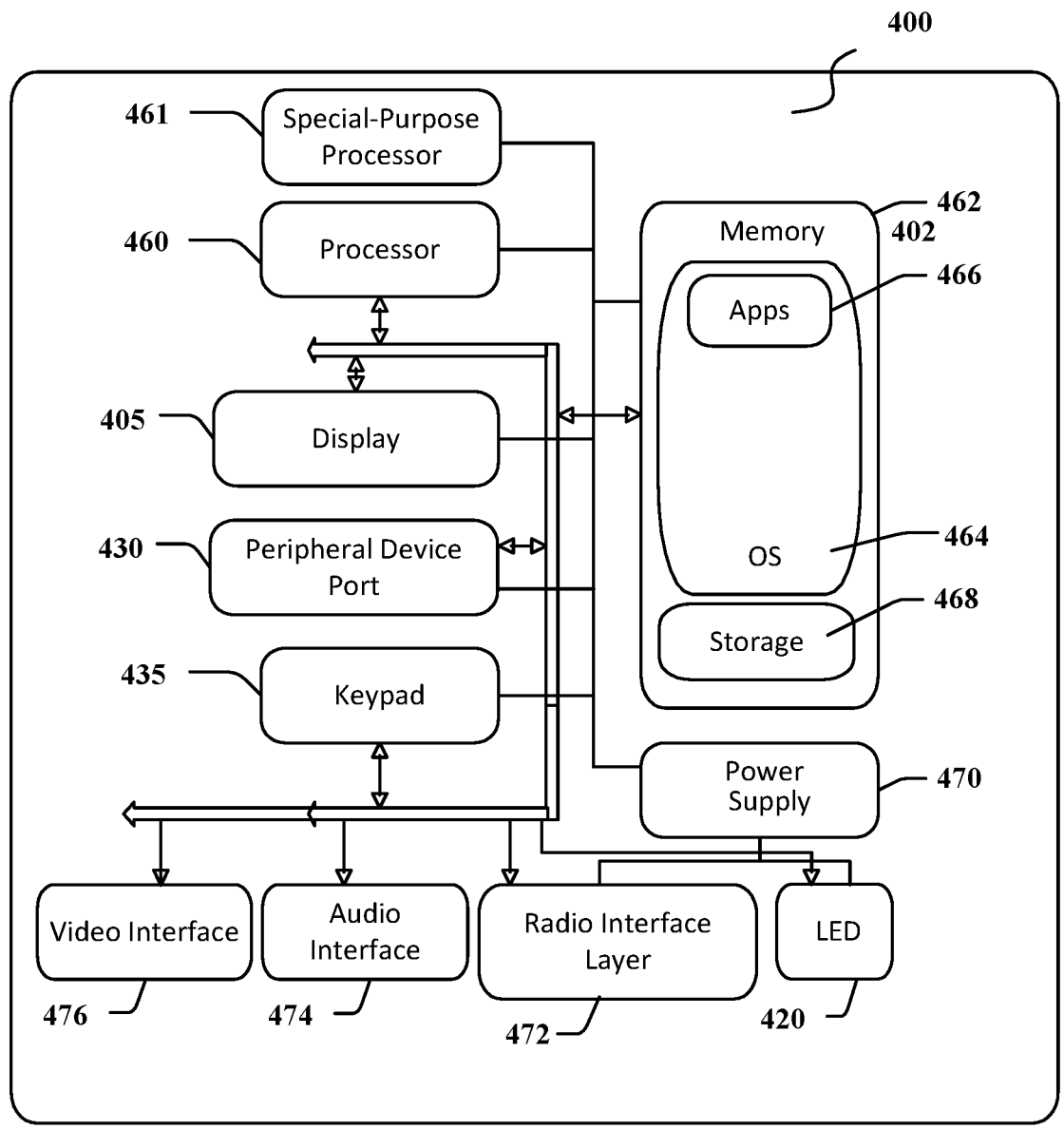

FIGS. 3 and 4 illustrate a mobile computing device 300, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 3, one aspect of a mobile computing device 300 for implementing the aspects is illustrated. In a basic configuration, the mobile computing device 300 is a handheld computer having both input elements and output elements. The mobile computing device 300 typically includes a display 305 and one or more input buttons 310 that allow the user to enter information into the mobile computing device 300. The display 305 of the mobile computing device 300 may also function as an input device (e.g., a touch screen display). If included, an optional side input element 315 allows further user input. The side input element 315 may be a rotary switch, a button, or any other type of manual input element. In alternative aspects, mobile computing device 300 may incorporate more or less input elements. For example, the display 305 may not be a touch screen in some embodiments. In yet another alternative embodiment, the mobile computing device 300 is a portable phone system, such as a cellular phone. The mobile computing device 300 may also include an optional keypad 335. Optional keypad 335 may be a physical keypad or a "soft" keypad generated on the touch screen display. In various embodiments, the output elements include the display 305 for showing a graphical user interface (GUI), a visual indicator 320 (e.g., a light emitting diode), and/or an audio transducer 325 (e.g., a speaker). In some aspects, the mobile computing device 300 incorporates a vibration transducer for providing the user with tactile feedback. In yet another aspect, the mobile computing device 300 incorporates input and/or output ports, such as an audio input (e.g., a microphone jack), an audio output (e.g., a headphone jack), and a video output (e.g., a HDMI port) for sending signals to or receiving signals from an external device.

FIG. 4 is a block diagram illustrating the architecture of one aspect of a mobile computing device. That is, the mobile computing device 400 can incorporate a system (e.g., an architecture) 402 to implement some aspects. In one embodiment, the system 402 is implemented as a "smart phone" capable of running one or more applications (e.g., browser, e-mail, calendaring, contact managers, messaging clients, games, and media clients/players). In some aspects, the system 402 is integrated as a computing device, such as an integrated personal digital assistant (PDA) and wireless phone.

One or more application programs 466 may be loaded into the memory 462 and run on or in association with the operating system 864. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400, including the instructions for providing and operating a rules platform.

The system 402 has a power supply 470, which may be implemented as one or more batteries. The power supply 470 might further include an external power source, such as an AC adapter or a powered docking cradle that supplements or recharges the batteries.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 466 via the operating system 464, and vice versa.

The visual indicator 320 may be used to provide visual notifications, and/or an audio interface 474 may be used for producing audible notifications via the audio transducer 325. In the illustrated embodiment, the visual indicator 320 is a light emitting diode (LED) and the audio transducer 325 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 325, the audio interface 474 may also be coupled to a microphone to receive audible input, such as to facilitate a telephone conversation. In accordance with embodiments of the present disclosure, the microphone may also serve as an audio sensor to facilitate control of notifications, as will be described below. The system 402 may further include a video interface 476 that enables an operation of an on-board camera 330 to record still images, video stream, and the like.

A mobile computing device 300 implementing the system 402 may have additional features or functionality. For example, the mobile computing device 300 may also include additional data storage devices (removable and/or non-removable) such as, magnetic disks, optical disks, or tape. Such additional storage is illustrated in FIG. 4 by the non-volatile storage area 468.

Data/information generated or captured by the mobile computing device 300 and stored via the system 402 may be stored locally on the mobile computing device 300, as described above, or the data may be stored on any number of storage media that may be accessed by the device via the radio interface layer 472 or via a wired connection between the mobile computing device 300 and a separate computing device associated with the mobile computing device 300, for example, a server computer in a distributed computing network, such as the Internet. As should be appreciated such data/information may be accessed via the mobile computing device 300 via the radio interface layer 472 or via a distributed computing network. Similarly, such data/information may be readily transferred between computing devices for storage and use according to well-known data/information transfer and storage means, including electronic mail and collaborative data/information sharing systems.

Figure 5:
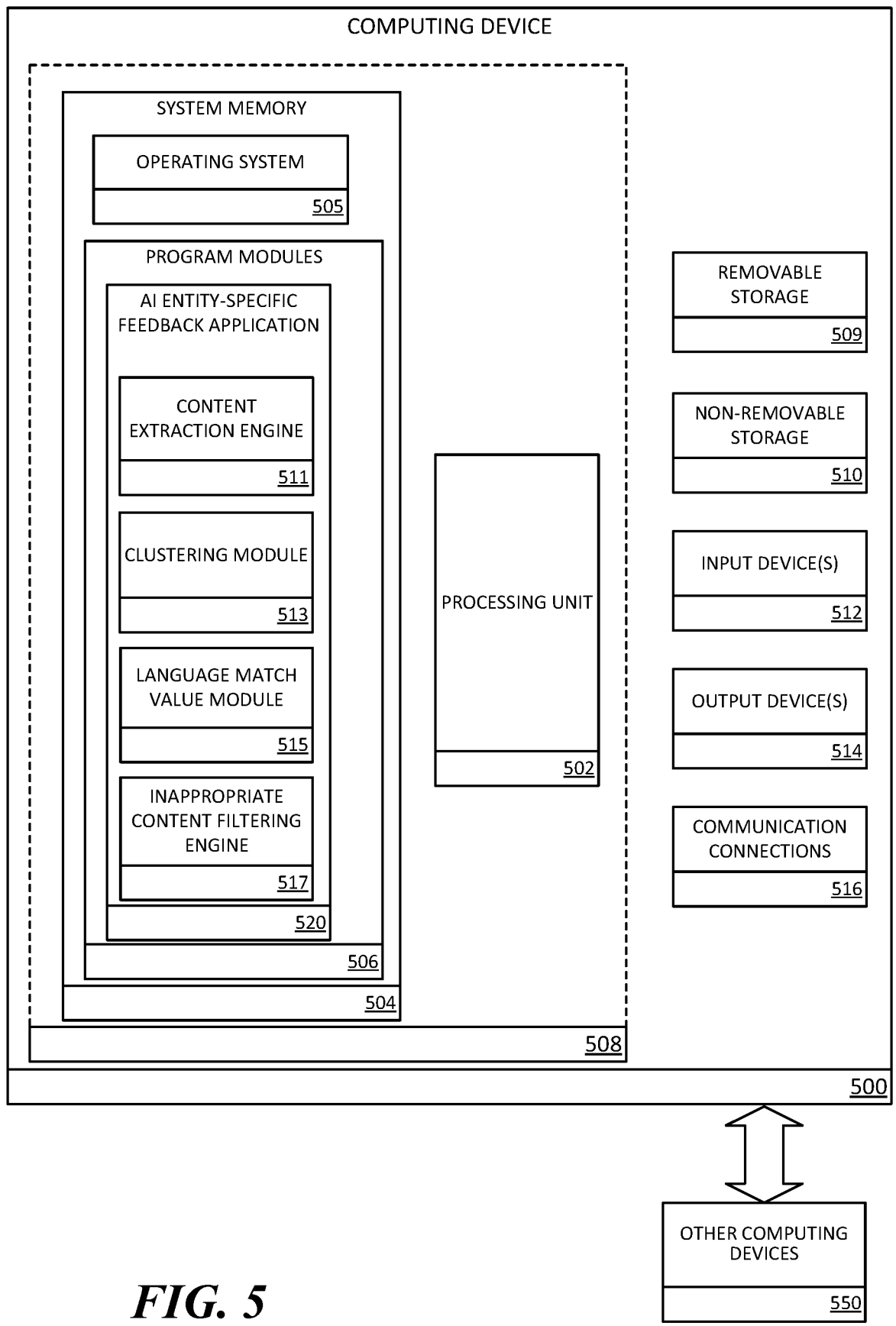
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for assisting with providing artificial intelligence entity-specific feedback on a computing device (e.g., server computing devices 122 and 124). In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 suitable for running one or more artificial intelligence entity-specific feedback programs or one or more components in regards to FIG. 1. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., AI entity-specific feedback application 520) may perform processes including, but not limited to, the aspects, as described herein. For example, content extraction engine 511 may extract entity-specific content from data sources associated with specific entities or entity figures. Clustering module 513 may utilize one or more language models in clustering extracted language associated with entities into language style type clusters. Language match value module 515 may perform operations that match a determined language style type for a user to one or more determined language style types for an entity. Inappropriate content filtering engine 517 may perform operations that filter inappropriate content from being provided to a user as feedback.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
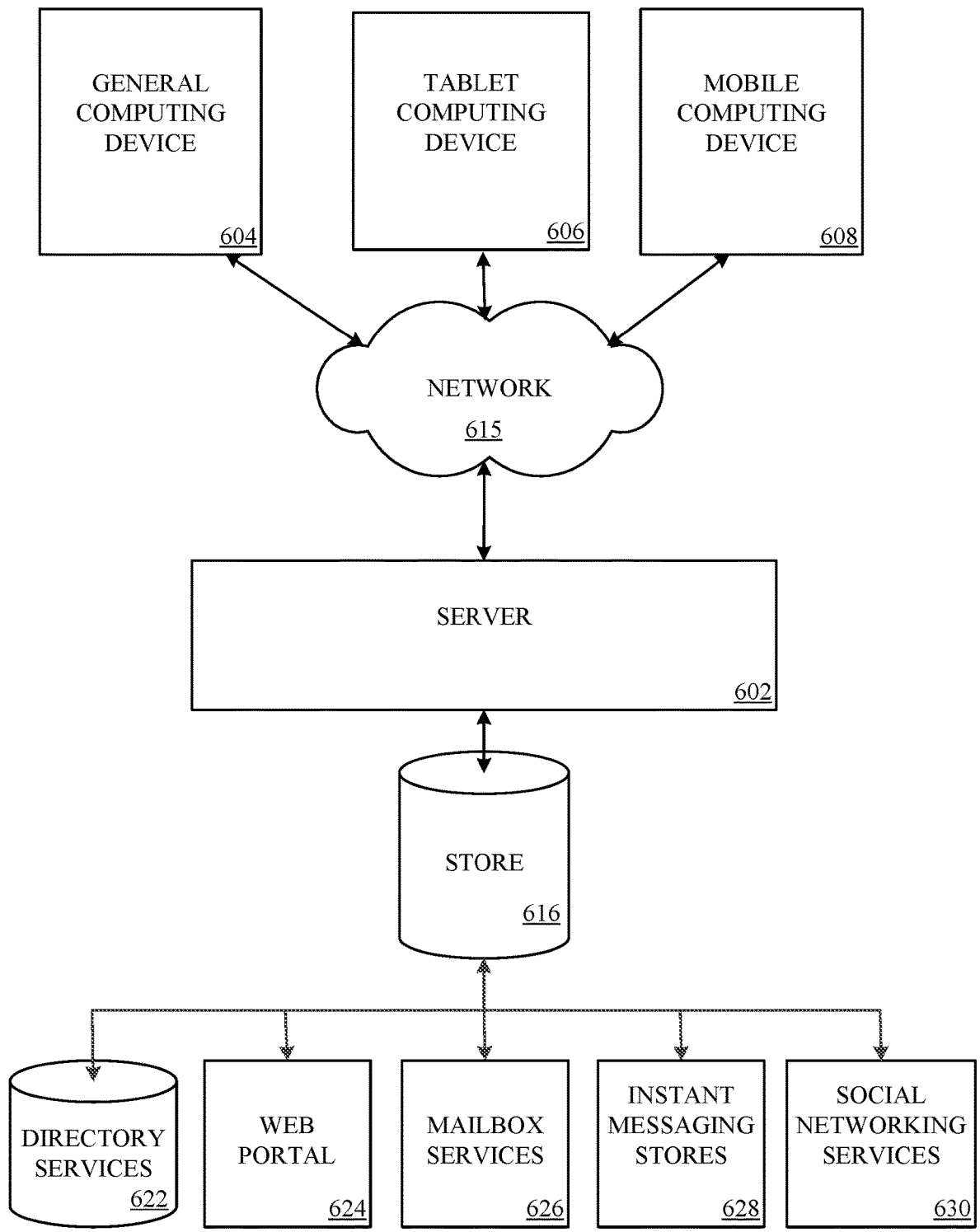
FIG. 6 is a simplified block diagram of a distributed computing system in which aspects of the present disclosure may be practiced.

FIG. 6 illustrates one aspect of the architecture of a system for processing data received at a computing system from a remote source, such as a personal/general computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. The AI entity-specific feedback application 506 may be employed by a client that communicates with server device 602, and/or the AI entity-specific feedback application 506 may be employed by server device 602. The server device 602 may provide data to and from a client computing device such as a personal/general computer 604, a tablet computing device 606 and/or a mobile computing device 608 (e.g., a smart phone) through a network 615. By way of example, the computer system described above with respect to FIGS. 3-5 may be embodied in a personal/general computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
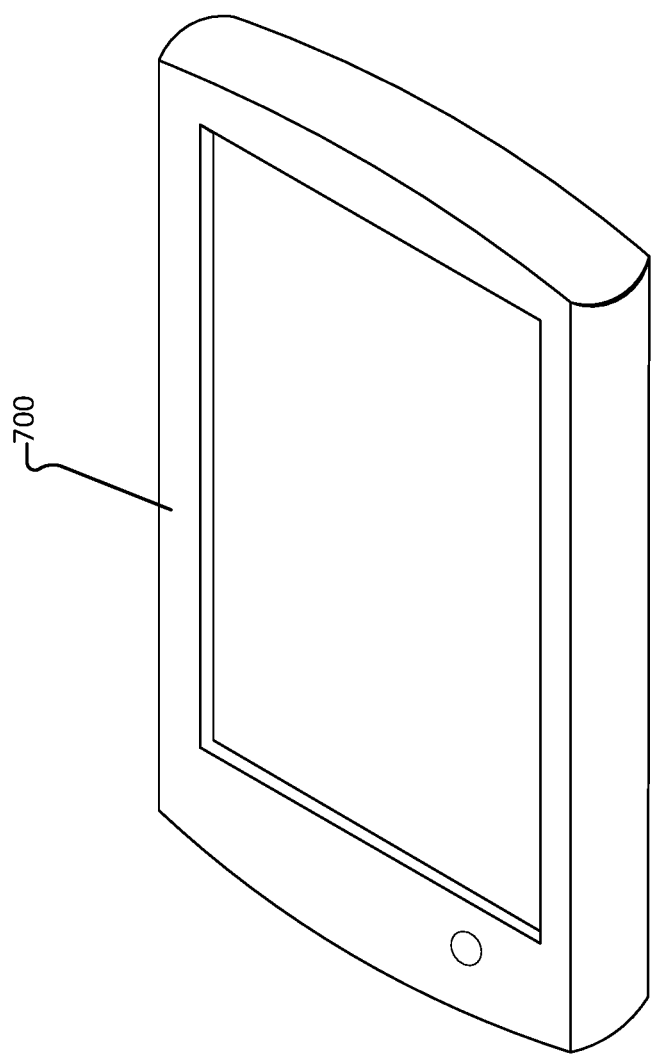
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for providing artificial intelligence (AI) entity-specific feedback, comprising:
    extracting a language set for an entity from a resource associated with the entity;
    applying at least one language style type identification model to the extracted entity language set to classify the extracted language set into clusters of entity language styles;
    based on the extracted language set and the entity language styles, building an AI entity corpus;
    receiving a request from a user to provide feedback;
    determining a user language style from the received request;
    determining, from the AI entity corpus, a plurality of potential responses to the received request based on the entity language styles and the determined user language style;
    ranking each of the plurality of determined potential responses based on a language style match analysis of the entity language styles to the determined user language style;
    providing at least one of the plurality of determined potential responses as feedback to the user based on the ranking when the received request to provide feedback does not match a defined custom query; and
    providing a custom answer to the user when the received request to provide feedback matches the defined custom query.

2. The method of claim 1, wherein extracting the language set for the entity further comprises extracting data from one or more official accounts associated with the entity.

3. The method of claim 2, wherein the one or more official accounts include at least one of: official websites managed by the entity, official social media feeds managed by the entity, official blog entries managed by the associated entity, and official application content managed by the associated entity.

4. The method of claim 1, wherein building the AI entity corpus further comprises performing machine learning on the extracted language set, the machine learning providing values to language from the extracted language set utilized in classifying the extracted language set into the clusters of entity language styles.

5. The method of claim 1, wherein the entity is an official figure associated with the entity.

6. The method of claim 1, wherein determining a plurality of potential responses further comprises identifying a language style in which to provide feedback.

7. The method of claim 1, wherein determining a plurality of potential responses further comprises matching one or more language styles for a specific entity figure to the determined user language style.

8. The method of claim 1, wherein determining a plurality of potential responses further comprises analyzing a flagged language corpus for potentially offensive content related to a received query corresponding to the received request to provide feedback.

9. The method of claim 8, further comprising adding new content to the flagged language corpus, the new content determined by identifying existing content that has been classified in the flagged language corpus and analyzing content received within a temporal threshold of the received query for words and phrases related to existing content that has been previously classified in the flagged language corpus.

10. A computer-readable storage device comprising executable instructions, that when executed by at least one processor, assist with providing artificial intelligence (AI) entity-specific feedback, the computer-readable storage device including instructions executable by the at least one processor for:
    extracting a language set for an entity from a resource associated with the entity;
    applying at least one language style type identification model to the extracted entity language set to classify the extracted language set into clusters of entity language styles;
    based on the extracted language set and the entity language styles, building an AI entity corpus;
    receiving a request from a user to provide feedback;

determining a user language style from the received request;

determining, from the AI entity corpus, a plurality of potential responses to the received request based on the entity language styles and the determined user language style;

ranking each of the plurality of determined potential responses based on a language style match analysis of the entity language styles to the determined user language style;

providing at least one of the plurality of determined potential responses as feedback to the user based on the ranking when the received request to provide feedback does not match a defined custom query; and providing a custom answer to the user when the received request to provide feedback matches the defined custom query.

11. The computer-readable storage device of claim 10, wherein extracting the language set for the entity further comprises extracting data from one or more official accounts associated with the entity.

12. The computer-readable storage device of claim 11, wherein the one or more official accounts include at least one of: official websites managed by the entity, official social media feeds managed by the entity, official blog entries managed by the associated entity, and official application content managed by the associated entity.

13. The computer-readable storage device of claim 10, wherein building the AI entity corpus further comprises performing machine learning on the extracted language set, the machine learning providing values to language from the extracted language set utilized in classifying the extracted language set into the clusters of entity language styles.

14. The computer-readable storage device of claim 10, wherein determining a plurality of potential responses further comprises identifying a language style in which to provide feedback.

15. The computer-readable storage device of claim 10, wherein determining a plurality of potential responses further comprises matching one or more language styles for a specific entity figure to the determined user language style.

16. A system for providing artificial intelligence (AI) entity-specific feedback, comprising:
a memory for storing executable program code; and
at least one processor, functionally coupled to the memory, the processor being responsive to computer-executable instructions contained in the program code and operative to:
extract a language set for an entity from a resource associated with the entity;
apply at least one language style type identification model to the extracted entity language set to classify the extracted language set into clusters of entity language styles;
based on the extracted language set and the entity language styles, build an AI entity corpus;
receive a request from a user to provide feedback;
determine a user language style from the received request;
determine, from the AI entity corpus, a plurality of potential responses to the received request based on the entity language styles and the determined user language style;
rank each of the plurality of determined potential responses based on a language style match analysis of the entity language styles to the determined user language style;
provide at least one of the plurality of determined potential responses as feedback to the user based on the ranking when the received request to provide feedback does not match a defined custom query; and
providing a custom answer to the user when the received request to provide feedback matches the defined custom query.

17. The system of claim 16, wherein extracting the language set for the entity further comprises extracting data from one or more official accounts associated with the entity.

18. The system of claim 17, wherein the one or more official accounts include at least one of: official websites managed by the entity, official social media feeds managed by the entity, official blog entries managed by the associated entity, and official application content managed by the associated entity.

19. The system of claim 16, wherein the entity is an official figure associated with the entity.

20. The system of claim 16, wherein determining a plurality of potential responses further comprises identifying a language style in which to provide feedback.

* * * * *